(12) United States Patent
Mountain

(10) Patent No.: US 9,497,509 B2
(45) Date of Patent: Nov. 15, 2016

(54) NAVIGATION TECHNIQUES FOR ELECTRONIC PROGRAMMING GUIDES AND VIDEO

(71) Applicant: ECHOSTAR UK HOLDINGS LIMITED, Steeton, Keighley (GB)

(72) Inventor: Dale Llewelyn Mountain, West Yorkshire (GB)

(73) Assignee: EchoStar UK Holdings Limited, Steeton (GB)

(*) Notice: Subject to any disclaimer, the term of this patent is extended or adjusted under 35 U.S.C. 154(b) by 0 days.

(21) Appl. No.: 13/689,482

(22) Filed: Nov. 29, 2012

(65) Prior Publication Data

US 2014/0150026 A1    May 29, 2014

(51) Int. Cl.
| | |
|---|---|
| *H04N 21/422* | (2011.01) |
| *H04N 21/482* | (2011.01) |
| *G06F 3/0485* | (2013.01) |
| *H04N 5/44* | (2011.01) |
| *G06F 3/01* | (2006.01) |
| *G06F 3/0488* | (2013.01) |
| *G06F 3/0346* | (2013.01) |

(52) U.S. Cl.
CPC ............ *H04N 21/482* (2013.01); *G06F 3/017* (2013.01); *G06F 3/0346* (2013.01); *G06F 3/0485* (2013.01); *G06F 3/04883* (2013.01); *H04N 5/4403* (2013.01); *H04N 21/42222* (2013.01); *H04N 21/42224* (2013.01); *H04N 21/4821* (2013.01); *G06F 2203/04806* (2013.01)

(58) Field of Classification Search
CPC .................... H04N 21/4821; H04N 21/4828; H04N 21/482; H04N 21/4222; H04N 21/42204; H04N 21/4224; H04N 5/4403; H04N 21/42224; H04N 21/42222

USPC .................. 725/37–58; 348/734; 374/734
See application file for complete search history.

(56) References Cited

U.S. PATENT DOCUMENTS

| | | | |
|---|---|---|---|
| 8,239,894 B2* | 8/2012 | Utsuki et al. ................... | 725/52 |
| 8,473,986 B2* | 6/2013 | Elshocht ........................ | 725/50 |
| 8,855,926 B1* | 10/2014 | Murphy ............. | G01C 21/3682 |
| | | | 701/400 |
| 2003/0122787 A1* | 7/2003 | Zimmerman et al. ........ | 345/173 |

(Continued)

FOREIGN PATENT DOCUMENTS

WO    2006-013485 A2    9/2006

OTHER PUBLICATIONS

Extended European Search Report for corresponding European Application No. 13193686.6, mailed Aug. 1, 2014, 7 pages.

*Primary Examiner* — Benjamin R Bruckart
*Assistant Examiner* — Aklil Tesfaye
(74) *Attorney, Agent, or Firm* — Kilpatrick Townsend & Stockton LLP

(57) ABSTRACT

A system for remote user navigation of content displayed with a display device, including a screen display, is provided. A user input device may be configured to detect a user movement, including a direction and a speed. The user input device may be configured to communicate information based at least in part on the direction and the speed. The system may include a media device configured to receive communications from the user input device. The media device may be configured to process the information from the user input device and to output content to the display device in accordance with a navigation operation. The navigation operation may include moving displayed content based at least in part on the direction and the speed.

20 Claims, 11 Drawing Sheets

(56) References Cited

U.S. PATENT DOCUMENTS

| | | | |
|---|---|---|---|
| 2006/0020966 A1* | 1/2006 | Poslinski | G09B 5/00 725/37 |
| 2006/0250358 A1 | 11/2006 | Wroblewski | |
| 2008/0151125 A1 | 6/2008 | Bucchieri | |
| 2008/0165255 A1* | 7/2008 | Christie et al. | 348/207.99 |
| 2009/0201249 A1 | 8/2009 | Yamamoto | |
| 2010/0138776 A1* | 6/2010 | Korhonen | G06F 3/04883 715/786 |
| 2010/0149432 A1* | 6/2010 | Roberts et al. | 348/734 |
| 2010/0269038 A1* | 10/2010 | Tsuda | 715/702 |
| 2011/0119578 A1* | 5/2011 | Schwartz | 715/702 |
| 2011/0252362 A1* | 10/2011 | Cho et al. | 715/784 |
| 2011/0267291 A1* | 11/2011 | Choi et al. | 345/173 |
| 2011/0273267 A1* | 11/2011 | Bong | 340/5.53 |
| 2012/0072953 A1* | 3/2012 | James | G06F 3/04883 725/52 |
| 2013/0002576 A1* | 1/2013 | Kim et al. | 345/173 |
| 2013/0176244 A1* | 7/2013 | Yamamoto | G06F 3/041 345/173 |
| 2013/0198782 A1* | 8/2013 | Arruda | H04N 21/4821 725/52 |
| 2013/0322848 A1* | 12/2013 | Li | H04N 5/783 386/241 |

* cited by examiner

802

806

| | 6:00 PM | 6:30 PM | 7:00 PM | 7:30 PM | 8:00 PM |
|---|---|---|---|---|---|
| 007 | The Life of Alexander Hamilton | | | | News |
| 007-HD | The Life of Alexander Hamilton | | | | News |
| 008 | News | Is it Baroque? (Or Rococo?) | | | Blues |
| 008-HD | News | Is it Baroque? (Or Rococo?) | | | Blues |
| 009 | Singing Competition XVI | | | Clues | |
| 010 | Not Your Average Suburb | | Ghost Hunter | | |
| 010-HD | Not Your Average Suburb | | Ghost Hunter | | |
| 011 | Sportsworld | | Sportsworld | | Baseball |

| | 11:00 PM | 12:00 AM | 1:00 AM | 2:00 AM | 3:00 AM | 4:00 AM | 5:00 AM | 6:00 AM | 7:00 AM | 8:00 AM |
|---|---|---|---|---|---|---|---|---|---|---|
| 005 | Red Morning | | | | News | Stock Watch | | Good Morning Sunshine | | |
| 005-HD | Red Morning | | | | News | Stock Watch | | Good Morning Sunshine | | |
| 006 | News | WW2 Dog Fights | | | | | | | | News |
| 006-HD | News | WW2 Dog Fights | | | | | | | | News |
| 007 | The Life of Winston Churchill | | Paid Pr | 812 | | | | | | News |
| 007-HD | The Life of Winston Churchill | | Paid Programming | | | | | | | News |
| 008 | News | Bach is Back | | Symphony Aficionado | | | | Masterpiece Murder Mystery | | |
| 008-HD | News | Bach is Back | | Symphony Aficionado | | | | Masterpiece Murder Mystery | | |
| 009 | Singing Competition XVI | | | Dancing Till You Drop | | | | Cricket Classics | | |
| 010 | Not Your Average Suburb | | Ghost Hunter | | | Toughest Jobs on Earth | | | | |
| 010-HD | Not Your Average Suburb | | Ghost Hunter | | | Toughest Jobs on Earth | | | | |
| 011 | Sportsworld | | Sportsworld | | Baseball | Fantasy Football | | 2010 Championship Game | | |
| 011-HD | Sportsworld | | Sportsworld | | Baseball | Fantasy Football | | 2010 Championship Game | | |
| 012 | BBB World News | | | Financial News Center | | | | Market Watch | | |
| 013 | The Life of Jeeves | | Spaghetti Western Marathon | | | | | | | |
| 013-HD | The Life of Jeeves | | Spaghetti Western Marathon | | | | | | | |

| | 3:00 PM | 4:00 PM | 5:00 PM | 6:00 PM | 7:00 PM |
|---|---|---|---|---|---|
| 007 | Doctor What | | | News | |
| 007-HD | Doctor What | | | News | |
| 008 | All in a Day's Work | | | Entertainment News | |
| 008-HD | All in a Day's Work | | | Entertainment News | |
| 009 | Wiggle World | | Funhouse | Johnny G | M-Force |
| 010 | Locked and Loaded | | Home | Garden | Fix It |
| 010-HD | Locked and Loaded | | Home | Garden | Fix It |
| 011 | Soccerworld | | Cricketworld | | Football |

NAVIGATION TECHNIQUES FOR ELECTRONIC PROGRAMMING GUIDES AND VIDEO

TECHNICAL FIELD

This disclosure relates to apparatus and methods of content display, and particularly to implementing navigation techniques for electronic programming guides and video.

BACKGROUND

A person watching television may have access to a large selection of television programming. Such television programming may be available across multiple channels and/or formats (e.g., scheduled programming, on-demand programming). An electronic programming guide (EPG) may be used to view current and upcoming television programming. With typical EPGs having an extensive list of channels and programming listings that extend over many days, navigating an EPG can be cumbersome.

In addition, various devices exist that can be used to receive and record television programs. In recent times, devices known as personal video recorders (PVRs) or digital video recorders (DVRs) have become commonplace. PVRs use a hard drive to record digital data that represents a television program. Various optical media and other forms of memory can be used to record television programs or digital representations thereof.

A typical manner in which a viewer is able access different portions of a recorded program is by scrolling forward or backward through the program stream, or by specifying a time to jump to in the stream. The scrolling may be referred to as fast-forwarding and rewinding, respectively. Linear navigation according to current techniques is time-consuming, often requires multiple button pushes, and can be non-intuitive. The viewer typically selects the scrolling options by pushing buttons of a remote control device. To select fast-forward, the viewer must select one button of the remote control device; to select rewind, the viewer must select another button the remote control device. Sometimes, a viewer has the option to select certain scrolling speeds. To select a particular scrolling speed, multiple button pushes are required, whether it be multiple pushes of the same button or pushing multiple buttons. Furthermore, specifying a time to jump to in the stream is not always intuitive and can involve an unacceptable amount of trial and error.

Thus, there is a need for improved navigation techniques for an electronic programming guide and recorded video. These and other needs are addressed by the present disclosure.

SUMMARY

Various methods, systems, and computer products are disclosed for remote navigation of content displayed on a display device. The remotely navigated content may include content of an electronic programming guide of a television tuning device. The remotely navigated content may include video content such as that recorded by a PVR/DVR or buffered while a viewer is watching a program. The remotely navigated content may include any linearly accessed video stream.

In some embodiments, remove navigation is provided with a user input device that includes a touch screen. In some embodiments, remove navigation is provided with a user input device that includes motion-sensing technology such that user may navigate by moving the user input device. In some embodiments, remove navigation operations may be inertia-based. The user input device may detect a user movement. In some embodiments, the user input device may identify certain characteristics of the user movement. In some embodiments, the user input device may identify one or more directions corresponding to the user movement. In some embodiments, the user input device may identify one or more speeds corresponding to the user movement. In some embodiments, the user input device may identify one or more distances corresponding to the user movement. In some embodiments, the user input device may identify one or more times corresponding to the user movement.

Input information corresponding to the one or more characteristics may be processed to identify specific information usable for correlation to a navigation operation. In some embodiments, the input information may be processed algorithmically. In some embodiments, the input information may be processed heuristically. In some embodiments, the input information may correspond to direction information at least partially indicative of one or more navigation operations. In some embodiments, the input information may correspond to speed information at least partially indicative of one or more navigation operations. In some embodiments, the input information may correspond to distance information at least partially indicative of one or more navigation operations. In some embodiments, the input information may correspond to time information at least partially indicative of one or more navigation operations.

In some embodiments, the user input device may transfer information to the television tuning device, and the television tuning device may identify instruction(s), commands, and/or navigation operations based on the information. In some embodiments, the user input device may identify instruction(s), commands, and/or navigation operations based on the information, and may transfer the instruction(s), commands, and/or navigation operations to the television tuning device.

In some embodiments, the navigation operation(s) may correspond to a scroll of an EPG. In some embodiments, the navigation operation(s) may correspond to a scroll of video. In some embodiments, the scroll may be a one-dimensional scroll in any suitable direction. In some embodiments, the scroll may be a two-dimensional scroll in any suitable direction. In some embodiments, the scroll may have a scroll speed, direction, and/or scroll type based at least in part on the detected user movement(s). In some embodiments, the scroll may coincide with a zoom operation, where the display of content zooms out as the scroll speed accelerates and zooms in as the scroll speed decelerates. In some embodiments, a zoom operation may be separate from a scroll operation. In some embodiments, the scroll type may include a scroll acceleration and a scroll deceleration without further user input. In some embodiments, the scroll type may include a scroll acceleration to a top speed that may then be maintained for a time depending on user input. In some embodiments, the scroll type may include a scroll acceleration to a top speed and a scroll deceleration to another speed that may then be maintained for a time depending on user input.

In some embodiments, a system for remote user navigation of content displayed with a screen display is disclosed. The system may include a display device comprising a screen display. The system may include a user input device. The user input device may be configured to detect a user movement, wherein the user movement comprises a first direction and a first speed. The user input device may be configured to communicate information based at least in part on the first direction and the first speed. The system may include a media device configured to receive communications from the user input device. The media device may include one or more processors and memory communicatively coupled with, and readable by, the one or more processors. The memory may have stored therein processor-readable instructions, which, when executed by the one or more processors, cause the one or more processors to: process the information from the user input device; and output content to the display device in accordance with a navigation operation, wherein the navigation operation comprises moving displayed content based at least in part on the first direction and the first speed.

In some embodiments, a method for remote user navigation of content displayed with a screen display is disclosed. The method may include detecting a user movement at a user input device and determining a first direction and a first speed corresponding to the user movement. The method may include communicating information based at least in part on the first direction and the first speed to a media device. The media device may be remote from the user input device. The method may include processing the information from the user input device and outputting content to a display device in accordance with a navigation operation. The navigation operation may include moving displayed content based at least in part on the first direction and the first speed.

In some embodiments, a computer-readable medium for remote user navigation of content displayed with a screen display, having sets of stored thereon, is disclosed. The instructions, when executed by a computer, may cause the computer to receive information from a user input device. The information may be based at least in part on a first direction and a first speed. The first direction and the first speed may correspond to a user movement detected at the user input device. The instructions may cause the computer to process the information from the user input device and to output content to a display device in accordance with a navigation operation. The navigation operation may include moving displayed content based at least in part on the first direction and the first speed.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures in conjunction with the description of certain embodiments presented herein. However, the appended figures should not be seen as limiting or defining the present disclosure.

FIG. 8A, FIG. 8B, and FIG. 8C illustrate a navigation feature, in accordance with certain embodiments of the present disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain embodiments of the present disclosure are directed to apparatus and methods of content display, and particularly to implementing navigation techniques for electronic programming guides and recorded video. The navigation techniques may be more intuitive and efficient. These and other benefits will be explained in detail below.

Although embodiments detailed herein may be directed toward controlling television-based equipment, the principles easily can be extended to other types of content and devices, such as video game equipment, computer equipment, handheld electronic devices, and the like. In addition, the terms "television" or "television service" can include traditional television programming, such as linear television programs, as well as other types of audio, video and/or audio/video content, such as on-demand video content, streaming video content and the like delivered via any type of content delivery systems, such as a cable, satellite, cellular/wireless, Internet/IP and/or any other content delivery technology or system currently known or hereafter developed. Furthermore, embodiments herein describe set-top boxes and/or other devices being connected with a television or other device having an electronic display. However, the navigation techniques can also be incorporated into the device having the electronic display, such as a television with an integrated cable, satellite or IPTV receiver. The technology discussed herein additionally can be extended to any of a variety of other electronic display devices, such as, for example, computers, tablets, hand-held mobile devices, cell phones, e-readers, personal media players, and the like. A person of ordinary skill in the art will recognize various alterations, additions, omissions, and substitutions.

Figure 1:
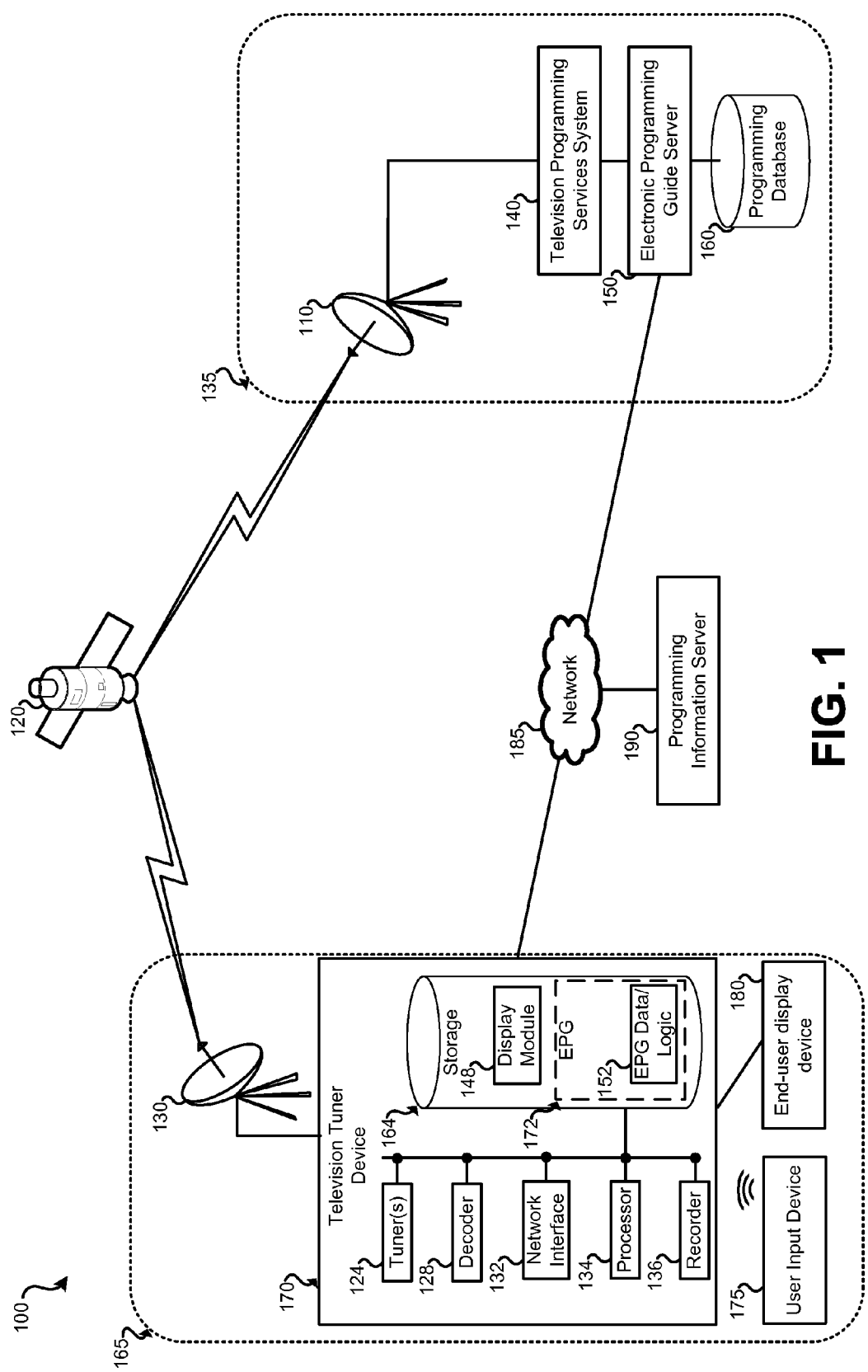
FIG. 1 illustrates an embodiment of a system, in accordance with certain embodiments of the present disclosure.

FIG. 1 illustrates an embodiment of a system 100, in accordance with certain embodiments of the present disclosure. The system 100 may include: a television service provider 135, an uplink station 110, a television programming services system 140, an electronic programming guide server 150, a programming database 160, a satellite 120, an end-user system 165, end-user equipment 130, a television tuner device 170, a user input device 175, an end-user display device 180, a network 185, and a programming information server 190. In some embodiments, more or fewer components may be present.

In some embodiments, a satellite-based television service, such as direct broadcast satellite (DBS) service, is used to deliver television services to end-users. DBS service may involve television channels and/or other content (e.g., on-demand programming) being transmitted via a satellite uplink and multiple downlinks to end-user equipment configured to receive satellite transmissions. As such, a single uplink (or multiple uplinks) may be used to deliver television channels and other content to a large number of end-users.

In the system 100, the uplink station 110 is configured to transmit one or more television channels and/or other content to the satellite 120. The satellite 120 may be located in geosynchronous orbit to provide continuous service to a particular geographical area. The satellite 120 may serve to relay information received from the uplink station 110 to a plurality of sets of end-user equipment such as the end-user equipment 130. In the system 100, only equipment linked to a single set of end-user equipment is illustrated for the sake of simplicity. For example, the end-user system 165 may contain the components present at an end-user's home or business. It should be understood that the system 100 may be used to deliver television channels and other content to many end-users, which may involve many end-user systems similar to the end-user system 165.

The end-user system 165 may include the television tuner device 170. The television tuner device 170 may be associated with or located near an individual, business, or other entity, user or subscriber that receives a program service transmission from the service provider 135. The program service transmission may be received through a subscription to the service. Generally the terms "user" and/or "subscriber" refer to an individual or company who receives a program service transmission. This may include those who have purchased a subscription to the program service transmission. Additionally, the terms "user" and/or "subscriber" may refer to individuals who have been given access to the program service transmission through promotional offers and/or other non-fee-based agreements.

The television programming services system 140 may represent one or more computer systems that are configured to provide one or more television channels and/or other content to the uplink station 110 to be delivered to the end-user equipment 130. The electronic programming guide server 150 may be part of the television programming services system 140 or may be separate. The electronic programming guide server 150 may provide television programming information to the television tuner device 170.

The electronic programming guide server 150 may communicate with one or more programming databases, such as the programming database 160. The programming database 160 may be located locally to electronic programming guide server 150 or may be remotely accessible. The programming database 160 may contain television programming information to be presented to end-users.

The television service provider 135 may own, manage, and/or operate the uplink station 110, the television programming services system 140, the electronic programming guide server 150, and/or the programming database 160. There may be more than one television service provider 135. In some embodiments, some or all of these components may be owned and/or operated by entities other than the television service provider 135.

The end-user equipment 130 may be configured to receive DBS service. The downlink from the satellite 120 to the end-user equipment 130 may be unidirectional. As such, while signals may be transmitted from the satellite 120 to the end-user equipment 130, signals may not be transmitted from the end-user equipment 130 to the satellite 120. Thus, while information may be received by the end-user equipment 130 from the television service provider 135 via the satellite 120, it may not be possible to use the same communication link to transmit information back to the television service provider 135. However, in some embodiments, the satellite communication link may be bidirectional.

The end-user equipment 130 may include one or more satellite dishes configured to receive signals from the satellite 120. In some embodiments, the end-user equipment 130 may include a single satellite dish equipped with multiple tuners. In some embodiments, a single tuner is connected with a satellite dish. In the system 100, a single television tuner device, the television tuner device 170 equipped with a tuner 124, is illustrated as connected with the end-user equipment 130. It should be understood that, in other embodiments, the end-user equipment 130 may be connected with multiple television tuner devices.

The television tuner device 170 may be or include a standalone piece of equipment, such as a set-top box. In some embodiments, the television tuner device 170 may be incorporated as part of another device, such as a television (or some other form of the end-user display device 180). The television tuner device 170 may communicate with multiple other pieces of equipment, such as the user input device 175, and the end-user display device 180. The end-user display device 180 may be a device that is used to display television channels and/or other televised content to an end-user. Examples of possible end-user display devices may include: televisions, computer systems, and mobile devices.

The television tuner device 170 may serve as an interface between the signals received from the satellite 120 by the end-user equipment 130 and the end-user display device 180. The television tuner device 170 may be configured to receive, analyze, and transmit information received from the satellite 120 by the end-user equipment 130 to the end-user display device 180. The television tuner device 170 may include a decoder 128 to decode received signals. The decoder 128 may be programmed to decrypt or otherwise decode some or all of the received signals in accordance with purchases and selections made by a user.

While the television tuner device 170 may receive information via the satellite 120 from the television service provider 135, this communication link may not allow information to be transmitted from the television tuner device 170 back to the television service provider 135, in certain embodiments. As such, another communication link may be used for communication that originates from the television tuner device 170. In the example depicted, the television tuner device 170 is in communication with the network 185.

The television tuner device 170 may include a network interface 132. The network interface 132 may be operable to communicate or send information across a data network, such as a packet based data network 185. The network interface 132 may take the form of a modem network interface card, cable plug or jack, or the like. Using the network interface 132, the television tuner device 170 may communicate over a network 185 such as the public switched telephone network (PSTN). However, it should be appreciated that the network 185 may be any type of network capable of data communication, such as, for example, a local or wide area network or the Internet. The television tuner device 170 may be configured to communicate via a home Wi-Fi network, a local area network, a cable modem, DSL modem, or any other form of available connection with the Internet. The television tuner device 170 may communicate through the network interface 132 using any suitable communication protocol such as TCP/IP. The television tuner device 170 may communicate with one or more websites through the network interface 132. In so doing, the television tuner device 170 may reference and receive information or other content that may be outputted on a display to provide an enhanced or expanded graphical user interface (GUI), in accordance with an example embodiment.

Through the network interface 132, a user may communicate with the service provider 135 in some embodiments. For example, a request for specific television programming information may be communicated to the service provider 135. As another example, the television tuner device 170 may be able to communicate with the electronic programming guide server 150. The television tuner device 170 may receive information or other content that may be outputted on the display 180 from the service provider 135. This information could include audiovisual clips or the like. Thus, while in the system 100 television programming information may be received by the television tuner device 170 via the satellite 120, it should be understood that in some embodiments television programming information may be transmitted to the television tuner device 170 by the electronic programming guide server 150 via the network 185. As such, the communication link between the television tuner device 170 and the electronic programming guide server 150 via the network 185 may be used for bidirectional communication.

In the system 100, television channels and/or other content may be delivered to end-users via a direct broadcast satellite arrangement. However, it should be understood that embodiments of this disclosure may pertain to other forms of televised content delivery. For example, cable television, which utilizes a cable network, may utilize various arrangements for organizing search results within an electronic programming guide as described herein. Similarly, a fiber-based television network and/or IP-based television network may utilize various arrangements for organizing search results within an electronic programming guide as described herein.

As depicted, the television tuner device 170 may be in communication with one or more programming information servers, such as the programming information server 190, e.g., via the network 185. The programming information server 190 may represent a computer system containing information on television programs and/or other content. For example, the programming information server 190 may have additional information about television programs and/or content in addition to (and/or the same as) what is present in the television programming information transmitted to the television tuner device 170 by the electronic programming guide server 150. For example, the programming information server 190 may have information about television programs such as: actors and/or actresses appearing in the television program, production of the television program (such as the director, the producer, the production company), the location of filming, a genre of the television program, television programs that are similar, and recommendations (e.g., if you like television program "x," you may enjoy television program "y"). Similar information may also be stored by the electronic programming guide server 150, such as in the programming database 160, but may not be transmitted to the television tuner device 170. Such information may be accessible by the television tuner device 170 via the network 185 from the electronic programming guide server 150 on request. By making such information available on request, the amount of data periodically transmitted to the television tuner device 170 by the electronic programming guide server 150 as part of the television programming information may be decreased.

The television tuner device 170 may include one or more processors 134 operable to run executable code in connection with various functions associated with the television tuner device 170. For example, the processor 134 may display graphics, images, animations or other content on the display 180, such as a television (TV) or monitor. In the case of receiving commands or other information relating to changes to the account status, the processor 134 may be further operable to initiate or facilitate transmission of one or more messages to the service provider 135. The processor 134 may be further operable to recall and display stored content, such as purchased or recorded programs.

Among other functions, the processor 134 may also receive, store, and/or display an on-screen graphical user interface (GUI) such as an Electronic Program Guide (EPG) 172, which may provide a schedule of program content and/or other features. Thus, the television tuner device 170 may be configured to execute and display (via the end-user display device 180) the EPG 172 based on television programming information received via the satellite 120 by the end-user equipment 130 from the electronic programming guide server 150. As used herein, the terms "electronic programming guide" or "EPG" may include an interface that includes a schedule of programming content provided to a user as part of a program service transmission system. The EPG 172 may include software and/or firmware executed by the television tuner device 170. The EPG 172 may comprise a database or may otherwise access a database containing information including, for example, names or titles of viewing events (programs), corresponding channel numbers and names, brief descriptions of the programs, start and finish times, and rating and content information related to the events. This information may be called EPG information or program information. Any suitable information may be included in the EPG information.

The EPG 172 may display on the end-user display device 180 program information for multiple times, multiple channels, and multiple television programs. For example, by an end-user interacting with EPG 172, the end-user may be able to determine at what time a television program is scheduled to appear on a particular television channel. The EPG 172 may also allow the end-user to switch between television channels. In addition to listing the time, channel, and name of the television program, additional information may be present for television programs, such as a brief description of the television program, a rating (e.g., G, PG, PG-13, R), and/or the year of release.

In some embodiments, such television programming information from the electronic programming guide server 150 may be transmitted for a period of days, such as a week, periodically, such as once per week, via the satellite 120 and/or the network 185. The EPG or program information may be communicated to the television tuner device 170 using a dedicated data channel. The processor 134 may execute a display module 148 or program, which accesses stored EPG data 152 and provides a formatted graphic output on the display 180.

In some embodiments, for EPG information provided on a specific channel, the tuner 124 may "tune" to the EPG data channel and collects the EPG information. The EPG information may be communicated in a serial fashion to the television tuner device 170, and thus, has a beginning and an end. For example, the EPG information may start with "program channel 1" and provide programming information for a predefined number of days or the like for that particular channel. Next, EPG information for "program channel 2" for the predefined number of days or the like may follow, and so on, until the EPG information for all "program channels" has been communicated to the television tuner device 170. The communication of the EPG information then starts again at the beginning of the EPG information. In some instances, the EPG information may simply be repeated. At other times, the EPG information may be updated and then communicated. This looped, periodically repeating communication of the entire EPG information is referred to as a "carousel" EPG information format.

If the television tuner device 170 begins receiving the EPG information midway during the communication of the "carousel" of EPG information, the television tuner device 170 understands that a complete set of EPG information has been received when it has gone through the entire carousel of EPG information. That is, the entire carousel of EPG information has been received when the received EPG information has returned to its initial entry point into the carousel of EPG information.

While the television tuner device 170 is receiving the EPG information, or once the television tuner device 170 has received a full set of EPG information, the television tuner device 170 can construct and display an EPG to a viewer on their viewing device, such as a television or the like. If the entire carousel of EPG information has not yet been received, a partial EPG may be constructed and presented to the viewer.

The viewer is able to interactively scroll about the EPG to view available programming on a program channel of interest. Also, the viewer is able to navigate about the EPG to view textual information related to scheduled programming at future times of interest on selected program channels of interest. The EPG 172 may be configured, based upon commands received from the user input device 175, to cooperatively work with the user input device 175 so that the viewer may request selected operations on a program of interest that is highlighted on the EPG.

The EPG data channel may include EPG information provided as the carousel of EPG information that is communicated in a periodic, serial fashion. That is, the EPG information in the EPG data channel is communicated in a serial format that is periodically repeated. If the television tuner device 170 has multiple tuners 124, one of the tuners 124 may be used to provide viewable programming and another tuner 124 can be used to tune to the EPG data channel to receive the carousel of EPG information.

The television tuner device 170 may include or be communicatively coupled to a recorder 136, such as a DVR (digital video recorder). The recorder 136 may be integrated into the television tuner device 170 or may be a stand-alone device. The recorder 136 may be operated by a user who programs the television tuner device 170 function to record a particular program at a specified time. When the program occurs, the recorder 136 will record and store the program, which can then be viewed later. In addition to this functionality, the recorder 136 may buffer a certain amount of content during a currently broadcast transmission. Buffering a currently broadcast transmission allows a user to pause and/or rewind the content of the transmission and to then display the content in a non-live or delayed manner.

The television tuner device 170 may include or be associated with a memory or other storage device 164, such as magnetic or optical storage. The storage device 164 may be operable to store data received from the decoded satellite signal. The storage device 164 may be operable to store data received from the decoded satellite signal. The storage device 164 may be volatile or non-volatile memory implemented using any suitable technique or technology such as, for example, random access memory (RAM), disk storage, flash memory, solid state, and the like. The storage device 164 may be located either within the television tuner device 170 or separately from the television tuner device 170. The storage device may also be removable in nature. The stored data set may include audio and/or visual content to be transmitted and displayed through the display 180. Generally, audiovisual or audiovisual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As a result commands or settings from a user, videos or other programs may be stored locally in storage device 164. Stored programs may include for example recorded broadcasts, pay-per-view items and/or buffered portions of a current video broadcast. The storage device 164 may contain various partitions or separate storage portions and may be used for implementation of a program buffer, DVR digital video recorder resources, and/or an EPG data and/or access logic storing portion 152.

The storage device 164 may additionally store an application, file, module or other data that is useable by the processor 134. In one instance, a stored application may be executed by the processor 134 to display content on the display 180, for example display module 148. As used herein, an application or module includes processor executable code that may be run to carry out one or more functions associated with the television tuner device 170. "Processor executable code" includes any computer-readable media or commands that may be ultimately interpreted by a processor, such as HTML or XML files that are rendered into user-viewable applications by an application executed by the processor. Alternatively, the processor or the television tuner device 170 may comprise a presentation device interface portion to hold this code.

The processor 134 may execute commands received from a user. User commands may be sent to the television tuner device 170 through the user input device 175 such as a remote or other wireless device, such as a remote control. The user input device 175 may be a remote control that allows the user to interact with the television tuner device 170. Specifically, the user input device 175 may permit an end-user to interact with the EPG 172 and/or recorded video displayed by the television tuner device 170 on the end-user display device 180 in accordance with features of certain embodiments disclosed herein. Information sent to the television tuner device 170 may include, for example, a command to change the displayed channel, a command to pause, fast-forward, and/or rewind a displayed program, a command to display an EPG 172, and/or a command to navigate through the EPG 172. Commands sent to the television tuner device 170 may be entered through a dedicated display menu.

Figure 2:
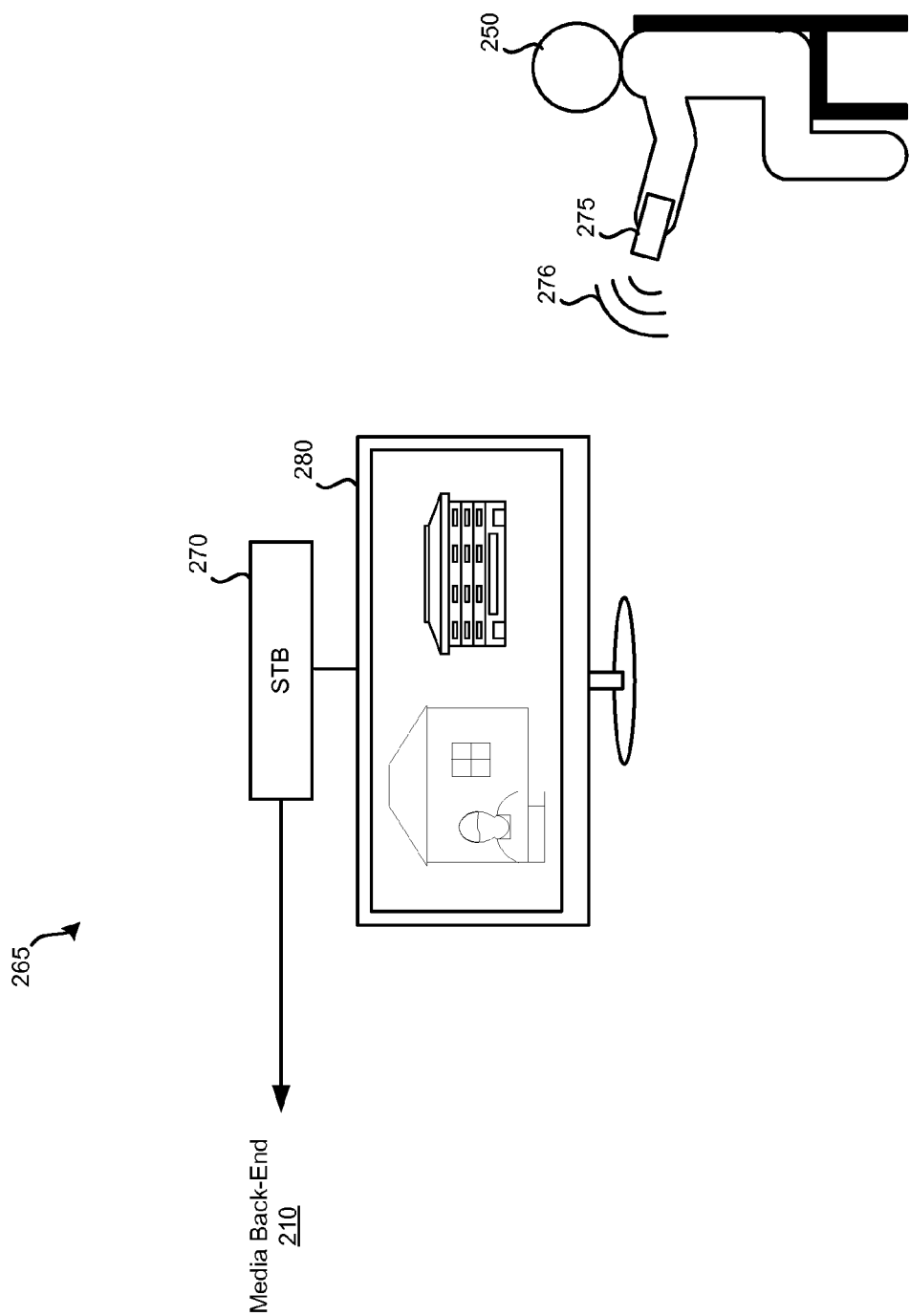
FIG. 2 illustrates a simplified embodiment of an end-user system, in accordance with certain embodiments of the present disclosure.

FIG. 2 is a simplified illustration of an embodiment of an end-user system 265, which may correspond to the end-user system 165, in accordance with certain embodiments of the present disclosure. The end-user system 265 may include the television tuner device 270, which may be a set-top box (STB) in certain embodiments, and an end-user display device 280. The display 280 can be controlled by a user 250 using a user input device 275 that can send wireless signals 276 to communicate with the television tuner device 270 and/or display 280. The user input device 275 can be configured to receive movement-based instructions from the user and convert the movements into instructions to be transmitted or otherwise provided to the television tuner device 270 and/or display 280. Although discussed as being wireless for user convenience, the technology may additionally include a wired coupling between the user input device 275 and television tuner device 270 in certain embodiments. Alternate embodiments of the end-user system 265 may include fewer or greater numbers of components.

The media service back-end 210 may correspond to elements of FIG. 1 communicatively coupled to the end-user system 165, such as one or more of the television service provider 135, an uplink station 110, a television programming services system 140, an electronic programming guide server 150, and/or the like. Thus, referring again to FIG. 2, the media service back-end 210 can provide media, in various forms, as discussed previously.

The television tuner device 270 can be configured to receive communications from the user input device 275. In certain embodiments, the communications may indicate movement-based instructions from the user input device 275. In certain embodiments, the communications may indicate motion information and/or direction information. In certain embodiments, the communications may indicate a command based on motion information and/or direction information. Thus, in certain embodiments, the television tuner device 270 may receive a command identified by the user input device 275 based on motion information and/or direction information derived from the user 250. However, in certain embodiments, the television tuner device 270 may receive motion information and/or direction information from the user input device 275 and then identify a corresponding command. Thus, once a movement-based instruction has been received, the television tuner device 270 may be further configured to identify the instruction associated with the movement provided. The media service back-end 210 may also be configured to perform the instruction in accordance with the identified movement.

Figure 3:
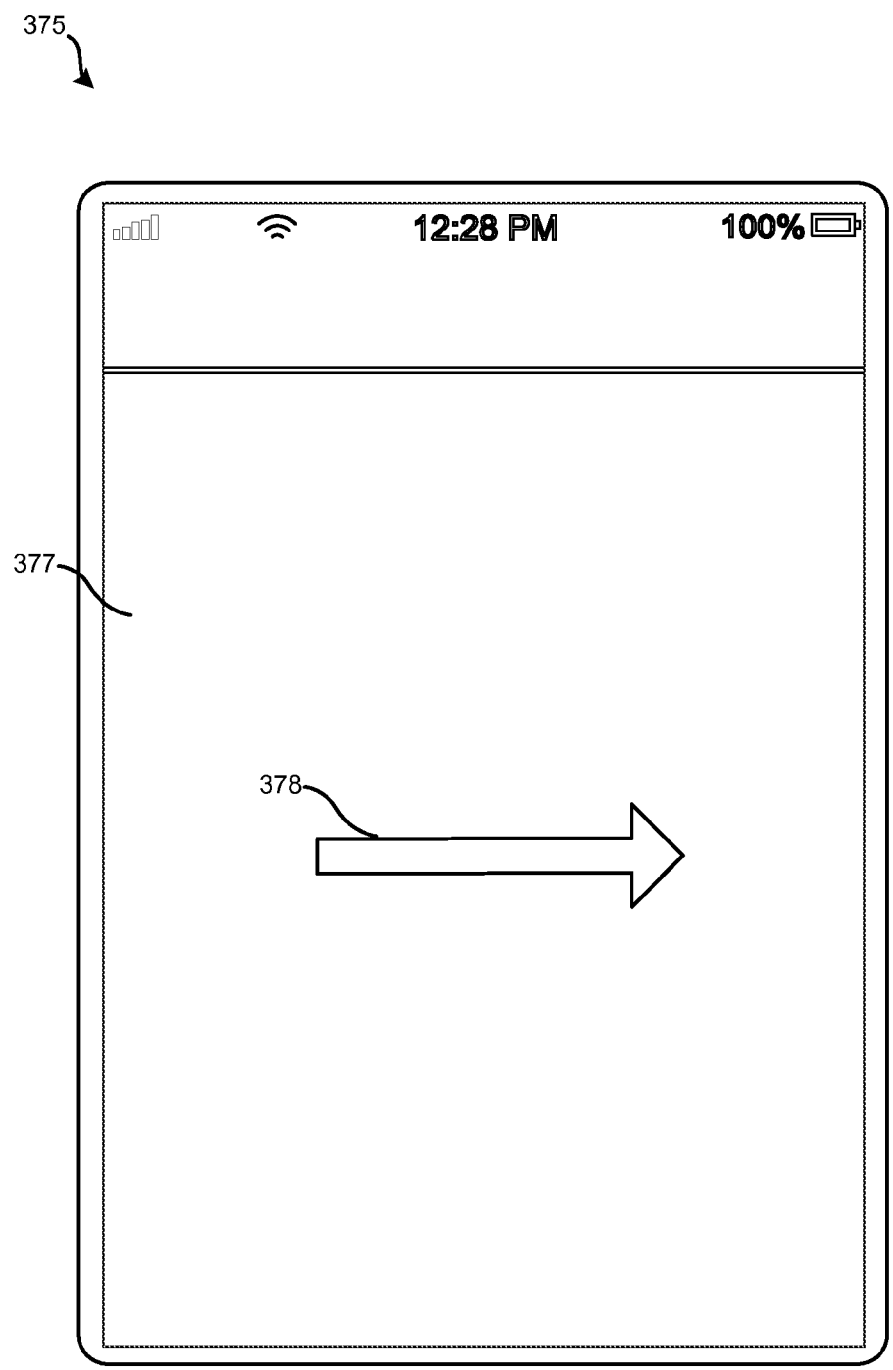
FIG. 3 illustrates an exemplary user input device, in accordance with certain embodiments of the present disclosure.
Figure 4:
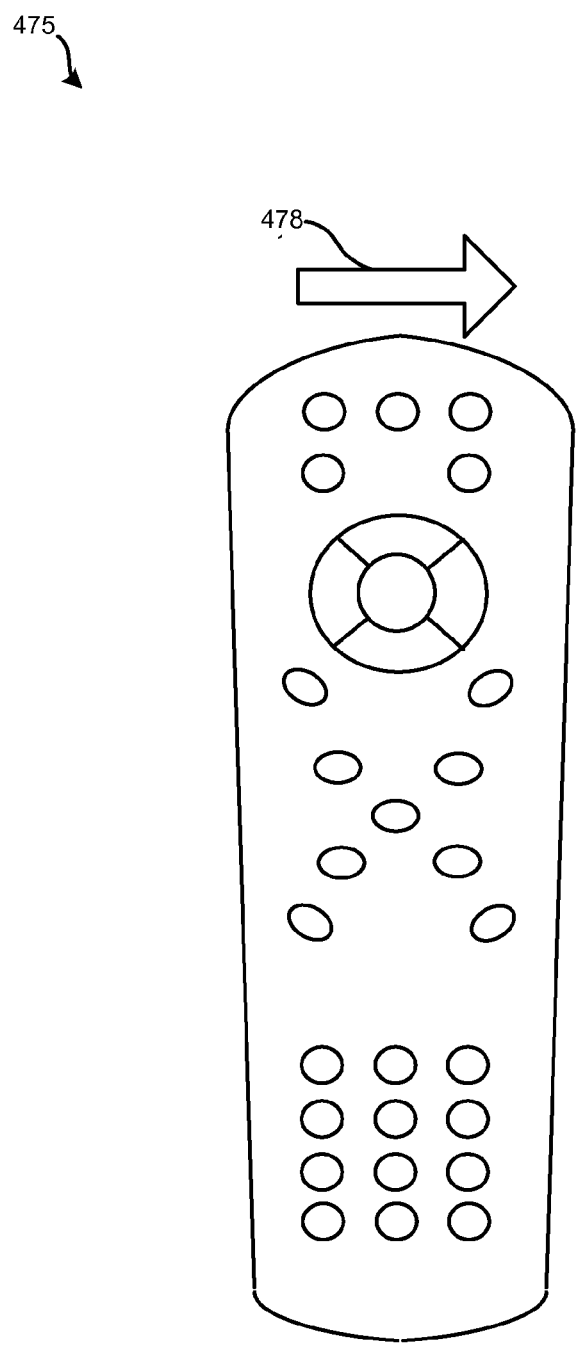
FIG. 4 illustrates another exemplary user input device, in accordance with certain embodiments of the present disclosure.

FIGS. 3 and 4 respectively illustrate exemplary user input devices 375 and 475, in accordance with certain embodiments of the present disclosure. As used herein, a "user input device" may include any device operable to receive input from a user and to convey the input to the television tuner device in accordance with features of certain embodiments disclosed herein. For example without limitation, in various embodiments, the user input device may include a mobile computing device such as one or more devices variously referenced as a mobile phone, a cellular telephone, a smartphone, a handheld mobile device, a tablet computer, a web pad, a personal digital assistant (PDA), a notebook computer, a handheld computer, a laptop computer, or the like. In certain embodiments, a mobile application may be made available for use on a mobile computing device to at least in part transform the mobile computing device into user input device in accordance with certain embodiments. Various embodiments may include a specific purpose-based mobile application, a mobile application integrated with various other mobile application features, or a native application on a dedicated device. In certain embodiments, a mobile application executed on a mobile computing device may provide for a user input device in accordance with features of certain embodiments disclosed herein. In some embodiments, the user input device may include one or more of a dedicated television remote control device, touchpad, remote control unit with motion sensing, and/or the like.

In some embodiments, the user input device may be a hand-held device having a number of buttons or keys that when actuated by a user cause the user input device to convey information to the television tuner device using a suitable communication means. In some embodiments, the user input device may include a pointing device or functionality that allows the user to control the position of a cursor that is displayed on the display. In some embodiments, the user input device may include a track ball or glide plane that may be manipulated to control cursor movements. Thus, in various embodiments, the input elements may include one or more of a keypad, a trackball, a touchscreen, a touchpad, a pointing device, a microphone, a voice recognition device, or any other appropriate mechanism for the user to provide input.

The user input device may include one or more antennas for wireless data transfer. In various embodiments, the communications functionality of the user input device may be implemented with an ICU package, a network card (wireless or wired), an infrared communication device, a wireless communication device and/or chipset (such as a Bluetooth™ device, an 802.11 device, a WiFi device, a WiMax device, cellular communication facilities, etc.), and/or the like. In various embodiments, the user input device may include various input elements to allow a user to input information. Thus, the user input device may include communications interfaces that can provide a near field communication interface.

Figure 5:
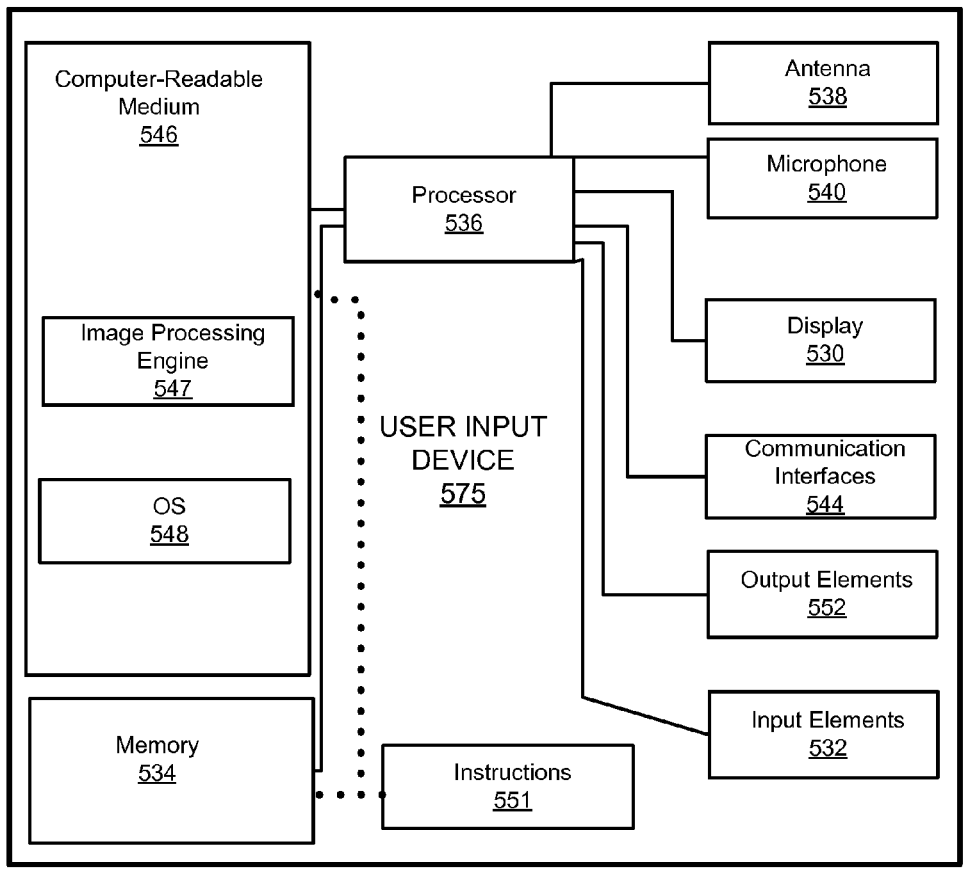
FIG. 5 illustrates a block diagram of a user input device, in accordance with certain embodiments of the present disclosure.

FIG. 5 depicts a block diagram of a user input device 575, in accordance with certain embodiments of the present disclosure. The user input device 575 may correspond to the user input devices 374 and/or 475 in some embodiments, however the user input devices illustrated herein should not be seen as limiting. Accordingly, the user input devices 374 and/or 475 and/or other user input devices may have fewer, more, and/or different components/features. The user input device 575 may include a display 530 and input elements 532 to allow a user to input information into the user input device 575. By way of example without limitation, the input elements 532 may include one or more of a keypad, a trackball, a touchscreen, a touchpad, a pointing device, a microphone, a voice recognition device, motion sensor(s), accelerometer(s), gyroscope(s), and/or any other appropriate mechanism for the user to provide input. The input elements 532 may be configured to identify touch screen contacts and/or device movements associated with instructions for operating the television tuning device and EPG/video navigation. The input elements 532 may be configured to identify direction, speed, distance, and/or time characteristics of touch screen contacts and/or device movements.

The user input device 575 may include a memory 534 communicatively coupled to a processor 536 (e.g., a microprocessor) for processing the functions of the device 575 and configured to perform processes such as decoding movements and instructions for output and transmission to a television tuning device. The user input device 575 may include at least one antenna 538 for wireless data transfer.

The user input device 575 may also include a microphone 540 to allow a user to transmit his/her voice through the user input device 575. In addition, the user input device 575 may include one or more interfaces in addition to the antenna 538, e.g., a wireless interface coupled to an antenna. The communications interfaces 544 can provide a near field communication interface (e.g., contactless interface, Bluetooth, optical interface, etc.) and/or wireless communications interfaces capable of communicating through a network such as a cellular network or through Wi-Fi, such as with a wireless local area network (WLAN). Accordingly, the user input device 575 may be capable of transmitting and receiving information wirelessly through both short range, radio frequency (RF) and cellular and Wi-Fi connections. The interfaces 544 may include one or more local communication interfaces. In some embodiments, a network interface 544 may be configured to communicate via one or more networks, such as the Internet, to communicate with a television provider server system. Information may be transmitted and/or received via interface 544. In some embodiments, by incorporating such a feature on the user input device 575, operational control may be maintained at the user input device 575 alternatively to the television tuning device, such that transmission is not required back and forth between the devices, and, accordingly, the user input device 575 may directly receive network information or EPG information, or may receive this information from the television tuning device.

The user input device 575 can also include at least one computer-readable medium 546 coupled to the processor 536, which stores application programs and other computer code instructions for operating the device, such as an operating system (OS) 548. The instructions 551 may be stored in the memory 534 and/or computer-readable media 546. The instructions 551 may be any set of instructions, application level or otherwise, that facilitate certain embodiments of the present disclosure. In some embodiments, the instructions 551 may correspond to an application that may have been pre-installed on the platform of the user input device 575. In other embodiments, the instructions 551 may correspond to a mobile application. In some embodiments, the application can include a customizable user interface (UI), which can be determined by the user's preferences through application-level programming. In some embodiments, the application can be used to display on the device an image corresponding to that which is displayed on the television display. For example, the user input device 575 may be configured to cause the display an EPG view corresponding to that display on a communicatively coupled TV. The computer-readable medium 546 can also include an image-processing engine 547 that may facilitate such image displays in some embodiments.

The user input device 575 may include a non-transitory computer-readable storage medium, e.g., memory 534, for storing instructions and/or data to facilitation detection, interpretation, and/or translation of user input to one or more direction information, speed information, and/or navigation instructions for use by the television tuning device in effectuating on-screen navigation of an EPG and/or video. In some embodiments, the computer-readable media 546 and/or the memory 534 may be used to store correlations between user movements and/or contacts and particular instruction(s)/information to be transmitted to the television tuning device. The computer-readable media 546 and/or the memory 534 may be used to store information received from the television tuning device and/or information received via network interface 544. The computer-readable media 546 and/or the memory 534 may additionally be used to store information received from one or more of the motion sensing technologies facilitated by the user input device 575. The interface(s) 544 may allow provision of information/instructions to and/or reception of information/instructions from the television tuning device. This information may be used to coordinate what is displayed, for example.

Referring again to FIGS. 3 and 4, the user input devices 375, 475 may be configured to detect a user motion, interpret the motion, and translate the motion to direction information. In certain embodiments, the user input device may also translate the motion to speed information. In certain embodiments, the user input device may provide the direct/speed information to the television tuning device, for the television tuning device to identify, process, and perform in accordance with instructions and/or commands. In certain embodiments, the user input device may identify instructions and/or commands based on the direct/speed information and provide the instructions and/or commands to the television tuning device.

In the non-limiting example depicted in FIG. 3, the user input device 375 includes a touch screen 377. In some embodiments, the touch screen 377 may include a display that is sensitive to touch. In some embodiments, the display may present an image corresponding to what is displayed on the display 180, 280. In some embodiments, the touch screen 377 may not include a display. The user may interact with the user input device 375 via finger contacts on the touch screen 377.

The user input device 375 includes a memory communicatively coupled to one or more processors (e.g., a microprocessor) for processing the functions of the user input device 375. The user input device 375 can also include at least one computer-readable medium coupled to the processor(s), which stores application programs and other computer code instructions for operating the device, such as an operating system (OS). The mobile/native application may be stored in the memory and/or computer-readable media. The computer-readable medium can include a touch processing application. In certain embodiments, the touch processing application can automatically run each time that a user accesses the mobile application. In some embodiments, the touch processing application can run continuously (e.g., in the background) or at other times, such as when the touch processing application is initiated by a user. With some embodiments, the touch processing application is separate from the mobile/native application. The touch processing application may have been pre-installed on the platform of the user input device 375. In other embodiments, the mobile/native application may include the touch processing application. The mobile/native application and/or the touch processing application can be used to detect finger contact from the user and process the analog input to derive digital information for transfer to the television tuner device. Use of the term "application" herein should not be construed as limiting, for certain embodiments may employ any instructions and/or circuitry to convert analog, motion-based user input to information usable by the television tuner device.

Thus, the touch screen 377 may be used to remotely access linear video in analog way. The user input device and/or the television tuning device may be configured to allow the user to navigate the content displayed. Instead of requiring button pushing, the user input device 375 may be configured to detect a movement of the user. Specifically, in certain embodiments, the user input device 375 may be configured to detect finger contacts on the touch screen 377 in various ways according to certain embodiments. In certain embodiments, the user may use the user input device 375 to navigate recorded video, such as a program that that was previously recorded by the DVR/PVR, a program that is buffered as the user views the program, recorded video on any medium such as a DVD, and/or any linearly accessed video stream. The user may wish to access different portions of recorded video and/or EPG information by scrolling forward or backward through the displayed content. The scrolling may be referred to as fast-forwarding and rewinding, respectively. With forwarding or rewinding at relatively faster rates, scrolling may include skipping certain frames or segments of displayable content. In certain embodiments, the user may use the user input device 375 for EPG navigation in the same or similar way.

To indicate a desired screen scroll, the user may apply finger contact to the touch screen 337. The user may touch the touch screen 337 at a first location and drag to a second location, in a certain direction or general direction and in a certain time. Such as user input may be referenced as a finger swipe.

A finger swipe across a portion of the touch screen 377 is indicated in FIG. 3 by arrow 378. The finger wipe 378 may be directed toward the right as depicted, or substantially directed toward the right. Such a direction may be detected by the touch screen 377, and the analog input of the finger swipe 378 may be processed by the user input device 375 into direction information. The processing may allow for variances in the finger swipe. For example, the finger swipe may be in various portions of the touch screen 377; the finger swipe may not be perfectly horizontal with respect to the touch screen 377; the finger swipe may not be perfectly straight; the finger swipe may be of varying lengths; etc. The user input device 375 may include conditioning electronics/instructions to handle such variances and derive direction information to correlate to a particular scroll function. The conditioning could include algorithmic and/or heuristic aspects. Thus, the user input device 375 may have smart translations features to account for input variances.

In the example depicted, the finger swipe 377 may correspond to a fast-forward instruction in certain embodiments directed to video stream navigation; the finger swipe 377 may correspond to a rightward scroll instruction in certain embodiments directed to EPG navigation. Though not depicted, a finger swipe in the opposite, or generally opposite, direction (i.e., to the left of the figure) may correspond to a rewind or leftward scroll instruction. Accordingly, scrolling direction may correspond to a direction, or a derived direction, of finger swipe on the user input device 375.

In the non-limiting example depicted in FIG. 4, the user input device 475 is a handheld device that includes a motion-sensing technology. Accordingly, the user input device 475 may be configured to detect based on the movement of a user. The motion-sensing technology may include accelerometers, cameras, motion sensors, and/or gyroscopic devices for recognizing movements. The user input device 475 may allow a user to control displayed items or graphics, such as a cursor, through movements of his or her hand or arm that cause a displacement of the user input device 475. The user input device 475 may be configured to identify a direction of movement and a speed of movement. The user input device 475 may include any suitable processing, memory, and other resources discussed above to allow a viewer to remotely access linear video in analog way in a fashion similar to the user input device 375. The user input device 475 and/or the television tuning device may be configured to allow the user to navigate the content displayed based on movement of the user, for example, by way of detecting lateral movement in various ways according to certain embodiments and correlating the movement to scrolling forward or backward through the displayed content of recorded video and/or an EPG.

To indicate a desired screen scroll, the user may move the user input device 475 to the side. In some embodiments, the user may flick the user input device 475 to the side with a short range of motion. In some embodiments, the user may move the user input device 475 to the side with a wide range of motion. In some embodiments, the user may tilt the user input device 475 to the side. Accordingly, the user may indicate a desired direction with a movement that is indicated in FIG. 4 by arrow 478. The movement 478 may be directed toward the right as depicted, or substantially directed toward the right. The analog input of the movement 478 may be detected by the user input device 475 and processed by the user input device 475 into direction information. The processing may allow for variances in the movement detected. The user input device 475 may include conditioning electronics/instructions to handle such variances and derive direction information to correlate to a particular scroll function. The conditioning could include algorithmic and/or heuristic aspects. Thus, the user input device 475 may have smart translations features to account for input variances.

In the example depicted, the movement 478 may correspond to a fast-forward instruction in certain embodiments directed to video stream navigation; the movement 478 may correspond to a rightward scroll instruction in certain embodiments directed to EPG navigation. Though not depicted, a movement in the opposite, or generally opposite, direction (i.e., to the left of the figure) may correspond to a rewind or leftward scroll instruction. Accordingly, scrolling direction may correspond to a direction, or a derived direction, of movement of the user input device 475.

A speed of movement may be detected as an indication of a desired screen scroll speed. For example, a speed of the finger swipe 378 may be detected as well the direction of the swipe; likewise, a speed of the movement 478 may be detected as well the direction of the swipe. The faster the detected speed is, the faster the scroll speed may be. The variances in scroll speed may include any number of predetermined rates. For example, in embodiments involving recorded video navigation, any number of scroll rates may be possible including, but not limited to 2×, 4×, 8×, 16×, 32×, 50× . . . N× the normal play rate.

Figure 6:
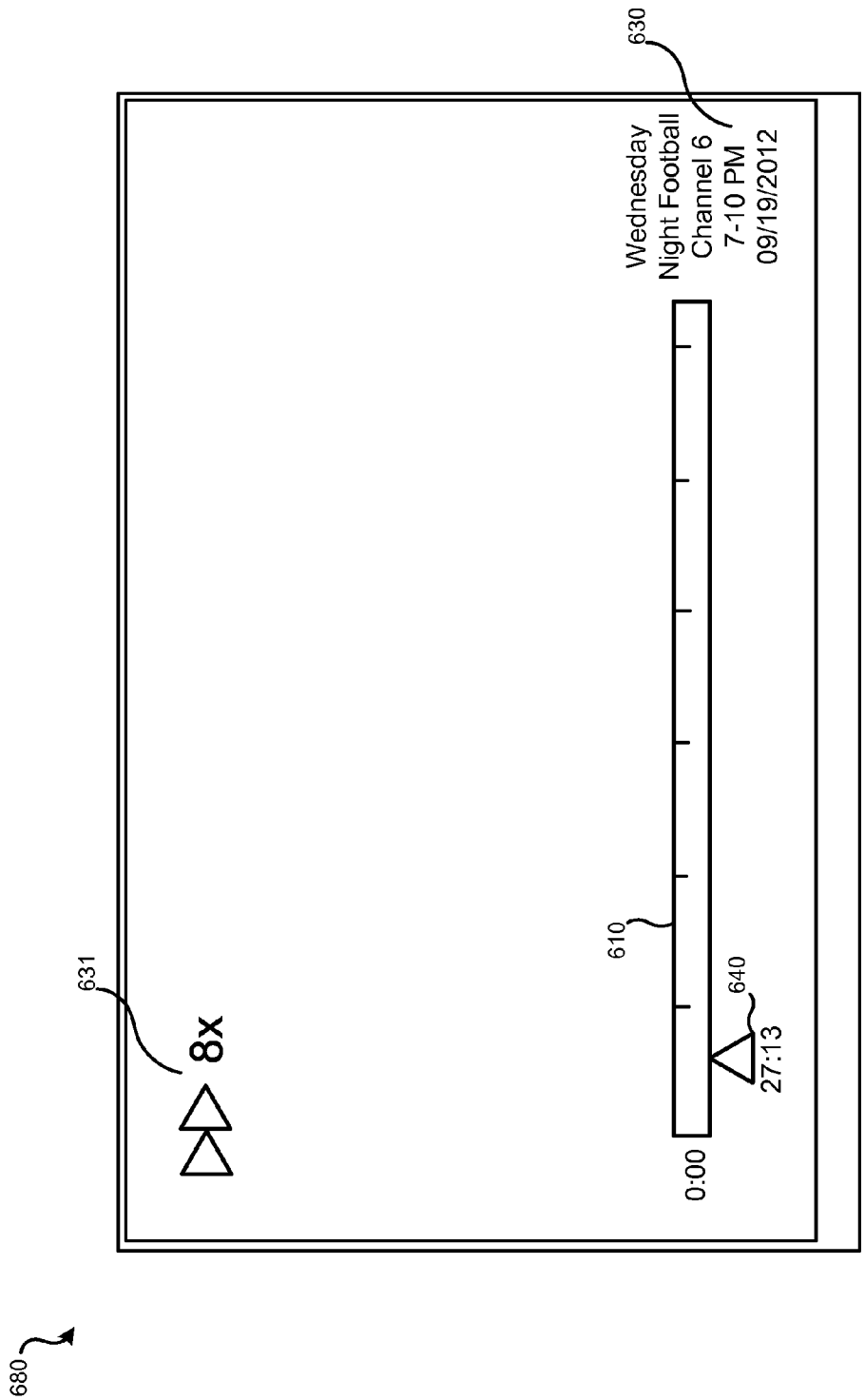
FIG. 6 illustrates an example of a scroll rate of on a display, responsive to a movement, in accordance with certain embodiments of the present disclosure.

FIG. 6 represents one non-limiting example of a scroll rate of 8× on a display 680, responsive to the finger swipe 378 and/or the movement 478. Progress bar 610 may be displayed by the display 680. Progress bar 610 may be rendered for display by the television tuner device and may be transmitted for display to the display 680. Progress bar 610 may represent programming that has been recorded for a period of time on a particular television channel as part of a recorded array of television channels. Displayed information 630 may indicate the television channel, the day, and/or the range of times during which the recorded television channel is available. Displayed scroll speed 631 may indicate the scroll rate. Indicator 640 may indicate where playback of the recorded television channel is currently occurring within the entire recorded television channel for the period of time.

Referring again to FIG. 3, a predetermined scroll rate may be associated with a predetermined finger swipe speed and/or range of finger swipe speeds. In some embodiments, the variances in scroll speeds may be not be determined and may be adaptive to various finger swipe speeds. In some embodiments, the user input device 375 may adaptive to variations of finger swipe speed specific to a user, thereby taking into account that some users may have quicker movement habits/abilities than others.

Accordingly, scrolling speed may correspond to a speed associated with the finger swipe. A faster scrolling speed may correspond to a faster finger swipe. Scrolling speed may be proportional to the speed of movement. Various embodiments may implement proportional speed control in various ways. A baseline finger swipe speed may be predetermined and associated with a low scroll speed. For example, a baseline finger swipe speed may be associated with a scroll speed of 2× the normal rate of play in the case of recorded video navigation. The screen scroll speed may be directly proportional to finger swipe speed.

In some embodiments, scrolling speed may correspond to the distance of finger swipe 378. A longer distance may be correlated to a faster scrolling speed. Conversely, a shorter distance may be correlated to a slower scrolling speed.

In some embodiments, scrolling speed may correspond to a number of finger swipes 378 in succession over a certain time period. For example, a user may apply two, three, or more finger swipes in rapid succession, which would then be translated to a faster scrolling speed(s). As another example, if the user already initiated a fast-forward operation and, then, while fast-forward operation continues, again applies one or more finger swipes, the user input device and the television tuning device may respond by increasing the rate of the scrolling speed.

Referring to FIG. 4, a predetermined scroll rate may be associated with a predetermined speed and/or range of speeds corresponding to movement of the user input device 475. In some embodiments, the variances in scroll speeds may be not be determined and may be adaptive to speeds of user input device movement. In some embodiments, the user input device 475 may adaptive to variations of finger swipe speed specific to a user, thereby taking into account that some users may have quicker movement habits/abilities than others.

Accordingly, scrolling speed may correspond to a speed associated with the user input device movement. A faster scrolling speed may correspond to a user input device movement. Scrolling speed may be proportional to the speed of movement. Various embodiments may implement proportional speed control in various ways similar to the features discussed above in relation to the embodiments of the user input device 375. In some embodiments, scrolling speed may correspond to the distance of that the user input device 475 is moved. A longer distance may be correlated to a faster scrolling speed. Conversely, a shorter distance may be correlated to a slower scrolling speed.

In some embodiments, scrolling speed may correspond to a number of movements of the user input device 475 in succession over a certain time period. For example, a user may move the user input device 475 two, three, or more finger swipes in rapid succession, which would then be translated to a faster scrolling speed(s). As another example, if the user already initiated a fast-forward operation and, then, while fast-forward operation continues, again moves the user input device 475 one or more finger additional times, the user input device 475 and the television tuning device may respond by increasing the rate of the scrolling speed. In certain embodiments, a viewer may select a motion sensing mode prior to navigation with the user input device 475. For example, the viewer may press button and flick or otherwise move the user input device 475.

In various embodiments, a scroll operation may take various forms. FIG. 7A illustrates characteristics of one form of a scroll operation, in accordance with certain embodiments. Graph 702 characterizes scroll speed versus time. Responsive to a finger swipe 378 on the touch screen 377 or a movement 478 of the user input device 475, the scrolling speed may increase in any manner and maintain a speed 704. Thus, the scroll speed may plateau at speed 704. In some embodiments, the speed 704 may be maintained for a predetermined time until point 706 and then ramp down. In some embodiments, the speed 704 may be maintained until receiving another finger contact on the touch screen 337 or another input with user input device 475 (e.g., selecting a button, a movement in the opposite direction, a downward movement, a forward movement, etc.), at which point 704, the speed may ramp down.

In some embodiments, where the viewer maintains finger contact with the touch screen 377 at the end of the finger swipe, the speed 704 may maintained based on the viewer maintaining finger contact with the touchscreen; thus, the when the user removes finger contact at point 706, the speed may ramp down. In certain embodiments, the speed higher than normal play speed may continue for a time after the viewer removes the finger from the touchscreen, where the continuance is based on the length of time that the viewer maintained finger contact with the touchscreen at the end of the finger swipe. Thus, for non-limiting example, if the viewer maintained finger contact with the touchscreen at the end of the finger swipe for 3 seconds, the speed higher than normal play speed may continue for 3 seconds after finger removal. Of course, it should be understood that the time of continuance may not be equivalent to the time of static finger contact, but may be based on the time of static finger contact in any suitable way. In some embodiments, similar functionality may be implemented with the user input device 475, for example, by maintaining a position at the end of the movement 478, maintaining a tilt orientation, selection of a button, and/or the like.

In some embodiments, such as in the case of fast-forwarding recorded video, the ramp down may actually be rollback in the stream a certain number of frames to account for delay in response time of the user after seeing a desired point in the stream. In some embodiments, such as in the case of navigating recorded video, the speed may ramp down from the top scrolling speed to normal play speed. In some embodiments, such as in the case of scrolling with an EPG, a similar rollback functionality may be implemented.

Figure 7B:
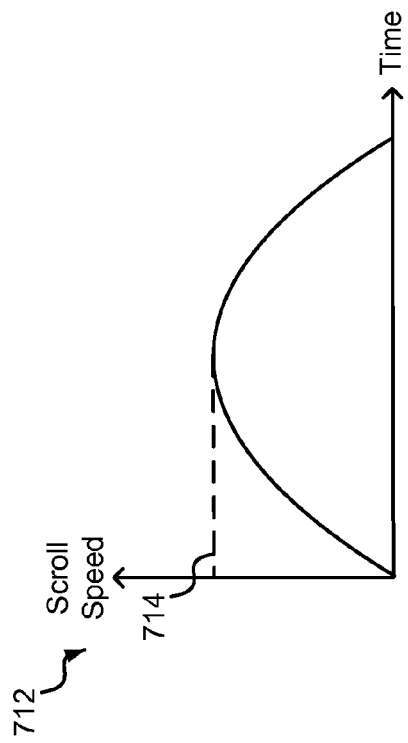
FIG. 7A, FIG. 7B, FIG. 7C, and FIG. 7D illustrate characteristics of various forms of scroll operations, in accordance with certain embodiments of the present disclosure.

FIG. 7B is a graph 712 that illustrates characteristics of another form of a scroll operation, in accordance with certain embodiments. Responsive to finger swipe or device movement, the scroll speed may ramp up to a speed 714 and then ramp down without further user input. The deceleration of the ramp-down may correspond to the acceleration of the ramp-up in some embodiments. In certain embodiments, the deceleration of the ramp-down may be proportional to the acceleration of the ramp-up.

Figure 7D:
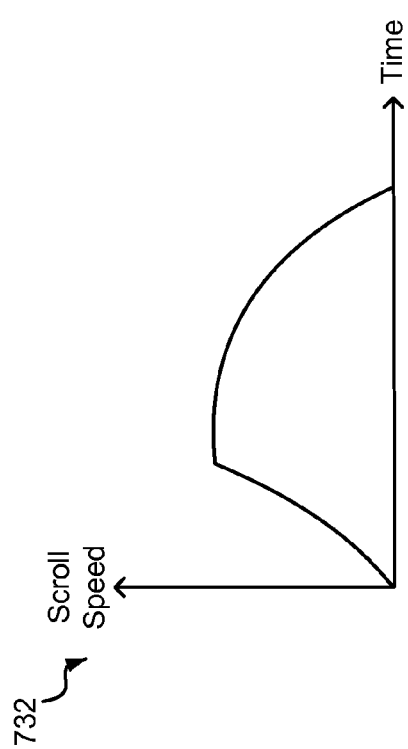
Figure 7A:
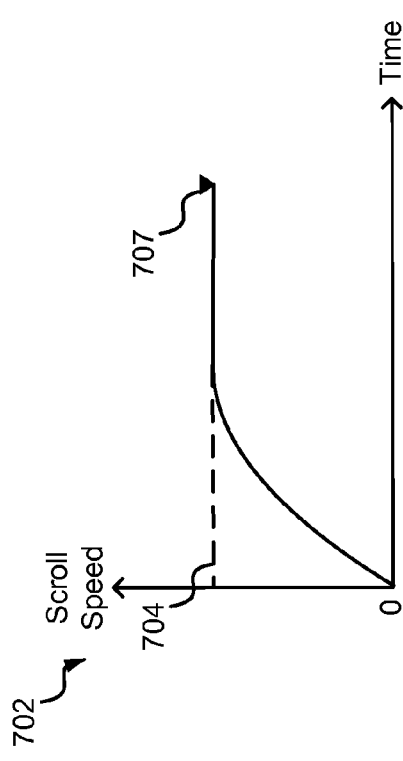
Figure 7C:
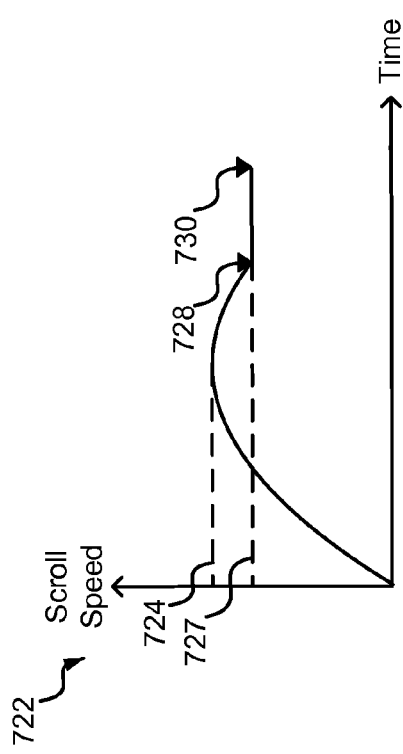

FIG. 7C is a graph 722 that illustrates characteristics of another form of a scroll operation, in accordance with certain embodiments. Responsive to finger swipe or device movement, the scroll speed may ramp up to a speed 724, then ramp down to a speed 726 at point 728, and then maintain the speed 726 for a time. The point 728 may be predetermined in some embodiments. In some embodiments, the point 728 may be determined by a finger contact after the swipe or another device input as discussed above. In some embodiments, the speed 726 may be maintained for a predetermined time and then ramp down. In some embodiments, the speed 726 may be maintained until another finger contact or another device input is received, and then ramp down.

FIG. 7D is a graph 732 that illustrates characteristics of yet another form of a scroll operation, in accordance with certain embodiments. As depicted, the ramp-up and ramp-up may have varying forms, with a faster ramp-up and a slower ramp-down. It should be understood that any suitable variation/combination of scrolling operations may employed with certain embodiments.

FIG. 8A, FIG. 8B, and FIG. 8C illustrate another navigation feature, in accordance with certain embodiments of the present disclosure. FIG. 8A depicts an example display 802 of an EPG that may be displayed on the display device 880. The example display 802 shows an EPG view that takes up the entire screen of the display device 880. In some embodiments, the EPG view may not take up the entire screen, but only a portion, such as a lower portion, a side portion, a combination of lower and side portions, etc. In some embodiments, a viewing window that may display a program may be displayed in addition to the EPG view. The EPG view 802 show a certain view of the overall EPG information with certain times 804, certain channels 806, and certain corresponding programs 808. The EPG view 802 may exemplify what a viewer may see prior to a scroll operation.

In some embodiments, a scroll operation may include a zoom operation. As a screen scroll proceeds, the view of the EPG may zoom out to show an expanded view that encompasses more the EPG information. FIG. 8B depicts an example EPG view 810 corresponding to a screen scroll (represented by arrow 812) toward the right. The EPG view 810 represents an expanded view encapsulating times 814 that are later in time than the times 804 of the previous view 802 and that have a greater range than the times 804 of the previous view 802. The expanded EPG view 810 also encapsulates channels 816 that have a greater range than the channels 806 of the previous view 802. The expanded EPG view 810 also encapsulates programs 818 corresponding to the times 814 and the channels 816. In this way, the viewer is afforded an expanded perspective when navigating the EPG.

FIG. 8C depicts an example EPG view 820 corresponding that may be seen at the end of a screen scroll operation, in some embodiments. At the end of the scroll operation, the displayed viewed has returned to the same zoom level of the view 802 before the screen scroll. As compared to the EPG view 802, the EPG view 820 depicts programs 828 corresponding to channels 826, which may be the same as previously displayed channels 806, at later times 824.

Such zoom navigation features may implemented with any one or combination of screen scroll operations disclosed herein. Accordingly, the EPG view may zoom out as the scroll speed increases and zoom in as the scroll speed decreases. In some embodiments, the degree of zoom adjustment may be based on the scroll speed. In some embodiments, the degree of zoom adjustment may be proportional to the scroll speed. In some embodiments, the zoom level may not return to the initial zoom level before the screen scroll. In some embodiments, the final zoom level may be determined by user input. In some embodiments, the zoom navigation features and/or scroll navigation features may be user-customizable.

It should be appreciated that, while one-dimensional scrolling navigation features have been discussed, certain embodiments could include multi-dimensional scrolling navigation features. For example, EPG navigation may allow for scrolling up and down the EPG view, thus allowing for scrolling along programming information for various channels for a given time frame.

Figure 9:
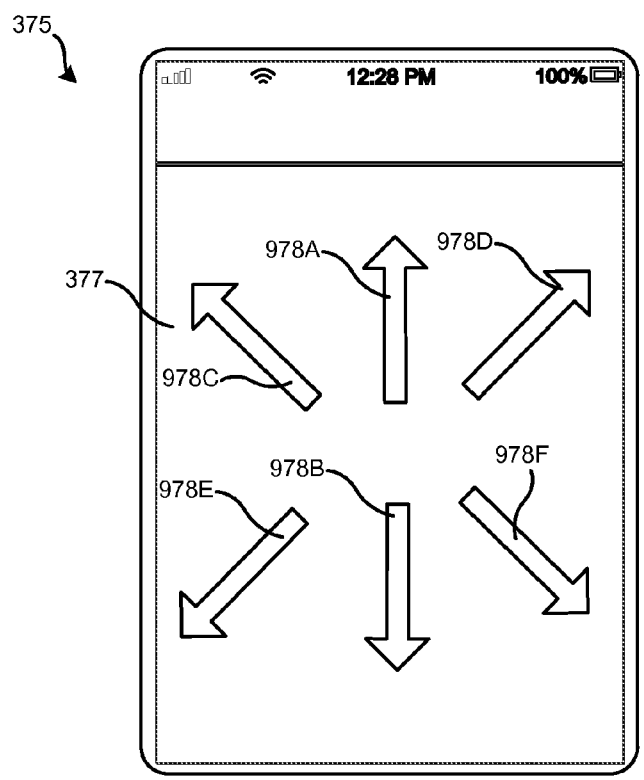
FIG. 9 illustrates various interactions with an exemplary user input device, in accordance with certain embodiments of the present disclosure.

As depicted in FIG. 9, for example, the user may apply one or more variously oriented finger swipes with the touch screen 377 of the user input device 375, as indicated in FIG. 9 by arrows 978A, 978B, and 978C-F. The finger swipe 978A, which may correspond to an upward or generally upward swipe, may result in scrolling upward through the EPG. The finger swipe 979B, which may correspond to a downward or generally downward swipe, may result in scrolling downward through the EPG. Each of the finger swipes 978C-F, which may correspond to an angular swipe, may result in scrolling at an angle through the EPG. Additionally, though not shown, zooming features may be used with the EPG. For example, a two-fingered pinching contact on the touch screen 377 may cause the displayed EPG view to zoom out; and a two-fingered spreading contact on the touch screen 377 may cause the displayed EPG view to zoom in.

Figure 10:
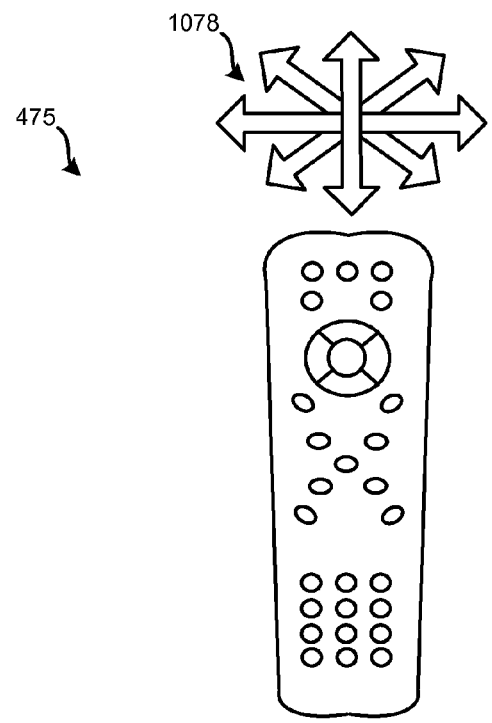
FIG. 10 illustrates various interactions with an exemplary user input device, in accordance with certain embodiments of the present disclosure.

Similarly, as depicted in FIG. 10, for example, the user may apply one or more variously oriented movement with the user input device 475, as indicated in FIG. 10 by arrows 1078. While the arrows 1078 are depicted a plane corresponding the plane of the user input device 475, which could be a horizontal plane, the directional movements could be along or generally along any plane or combination of planes. For example, an upward vertical movement of the device 475 could cause an upward scroll of the EPG; and a downward vertical movement of the device 475 could cause a downward scroll of the EPG. An angular movement of the device 475 could cause scrolling at an angle through the EPG. Zooming could be controlled in certain embodiments by forward movement toward the display and backward movement away from the display. In some embodiments, the user input device 475 may have user selectable modes, such as a scrolling mode and a zooming. A toggle button could control switching between modes. The user could select the zooming mode and flick the device 475 in any suitable direction to zoom in/out. The user could select the scrolling mode and flick the device 475 in any suitable direction to scroll through the EPG.

Figure 11:
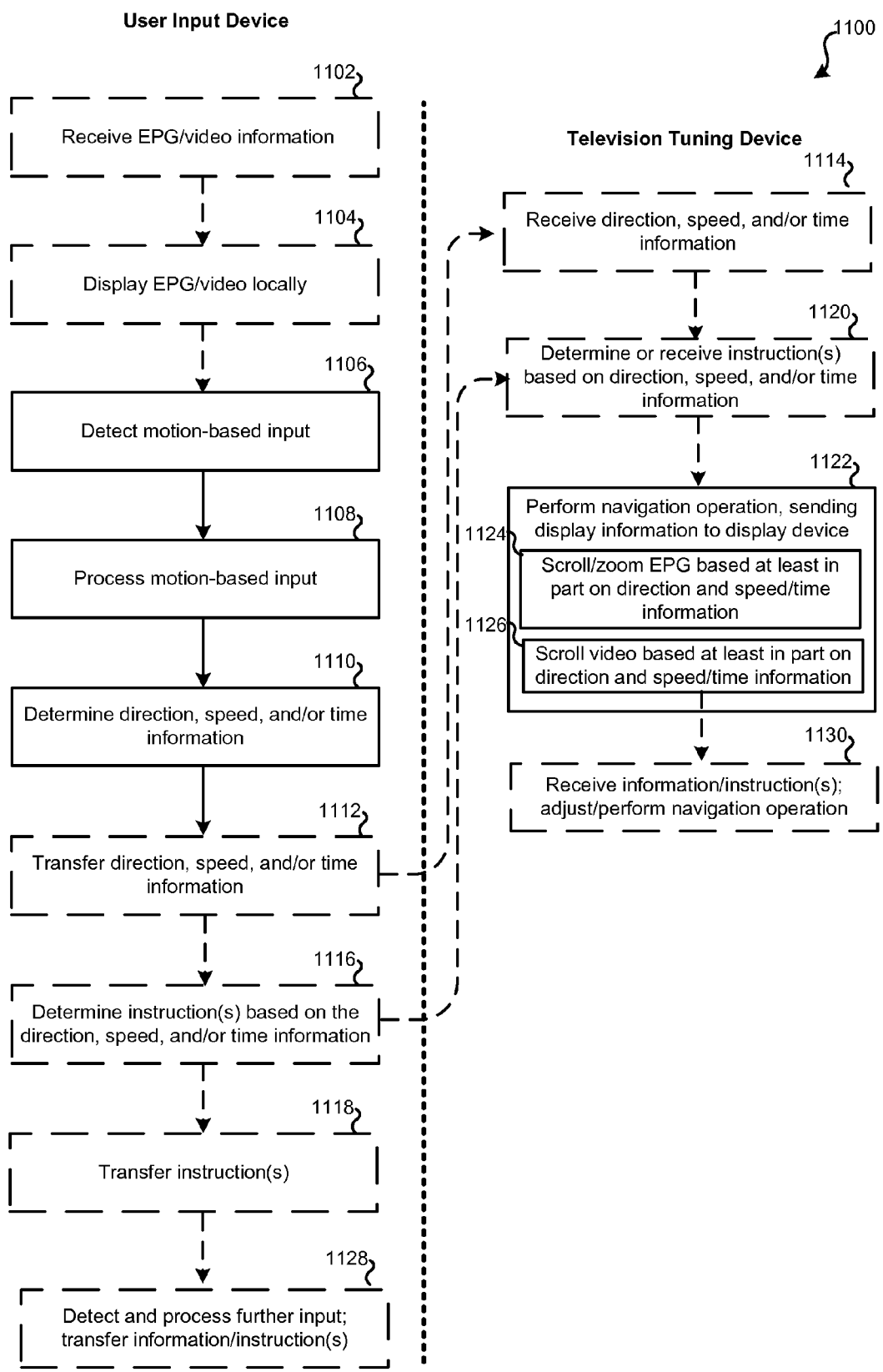
FIG. 11 illustrates an embodiment of a method for navigation, in accordance with certain embodiments of the present disclosure.

The systems and devices previously described may be used in performing various methods. FIG. 11 illustrates an embodiment of a method 1100 for navigation in accordance with certain embodiments of the present disclosure. Method 1100 may be performed using one or more of the systems or components previously described. Method 1100 may allow for user EPG/video navigation via movement-based instructions provided by a user. Means for performing each step of method 1100 may include a user input device and/or television tuning device.

Certain embodiments of the user input device may be configured to receive EPG and/or video information. For those that are, as indicated by step 1102, EPG and/or video information may be received by the user input device. The received EPG and/or video information may then processed and locally displayed on the user input device, as indicated by step 1104.

At step 1006, a motion-based input provided by the user may be detected by the user input device. The input may be received via any suitable input interface, including without limitation, a touch screen and/or a motion detecting handheld functionality (such as accelerometer-based/motion-sending functionality). The detection may involve application of algorithmic and/or heuristic processing, or other conditioning, as indicated by step 1108. The processing may discern the received input from a multitude possible inputs and may apply various techniques to refine the received input and correlate the input to a probable input. A direction, a speed, and/or a time may be derived from the input. Multiple directions, speeds, and/or time may be derived from the input. As indicated by step 1110, direction, speed, and/or time information may be determined via the processing.

In some embodiments, as indicated by step 1112, the direction, speed, and/or time information may be transferred to the television tuning device. Consequently, at step 1114, the television tuning device may receive direction, speed, and/or time information. In some embodiments, as indicated by step 1116, the user input device may further process the direction, speed, and/or time information to determine instruction(s) based on the information. For example, the user input device may correlate the direction, speed, and/or time information to a specific EPG/navigation scroll/zoom command. Alternatively, the user input device may correlate the direction, speed, and/or time information to specific instruction(s) useable by the television tuning device in identifying a corresponding navigation operation(s). Consequently, at step 1118, the user input device may transfer the instruction(s) to the television tuning device.

In the case of the television tuning device having receive direction, speed, and/or time information at step 1114, the television tuning device may further process the direction, speed, and/or time information to determine instruction(s) based on the information, as indicated by step 1120. At step 1122, the television tuning device may perform a navigation operation, sending display information to display device. The navigation operation may include a scrolling operation and/or adjusting the zoom level of a displayed EPG view, as indicated by step 1124. The navigation operation may include a scrolling operation for a video stream, as indicated by step 1126. Any of the scrolling and/or zooming features discussed herein may be employed. Thus, the scrolling direction may be based on the direction information, and the scroll speed may be based on the speed information and/or time information.

In some embodiments, further user input may be detected and processed, and corresponding information and/or instruction(s) may be determined and transferred to the television tuning device, as indicated by step 1128. The television tuning device may receive/determine the information and/or instruction(s), and adjust/perform navigation operations, as indicated by step 1130. For example, the user may have previously indicated a scrolling operation that resulted in a first scroll speed; and the further user input may correspond to an instruction to increase the scroll speed.

Figure 12:
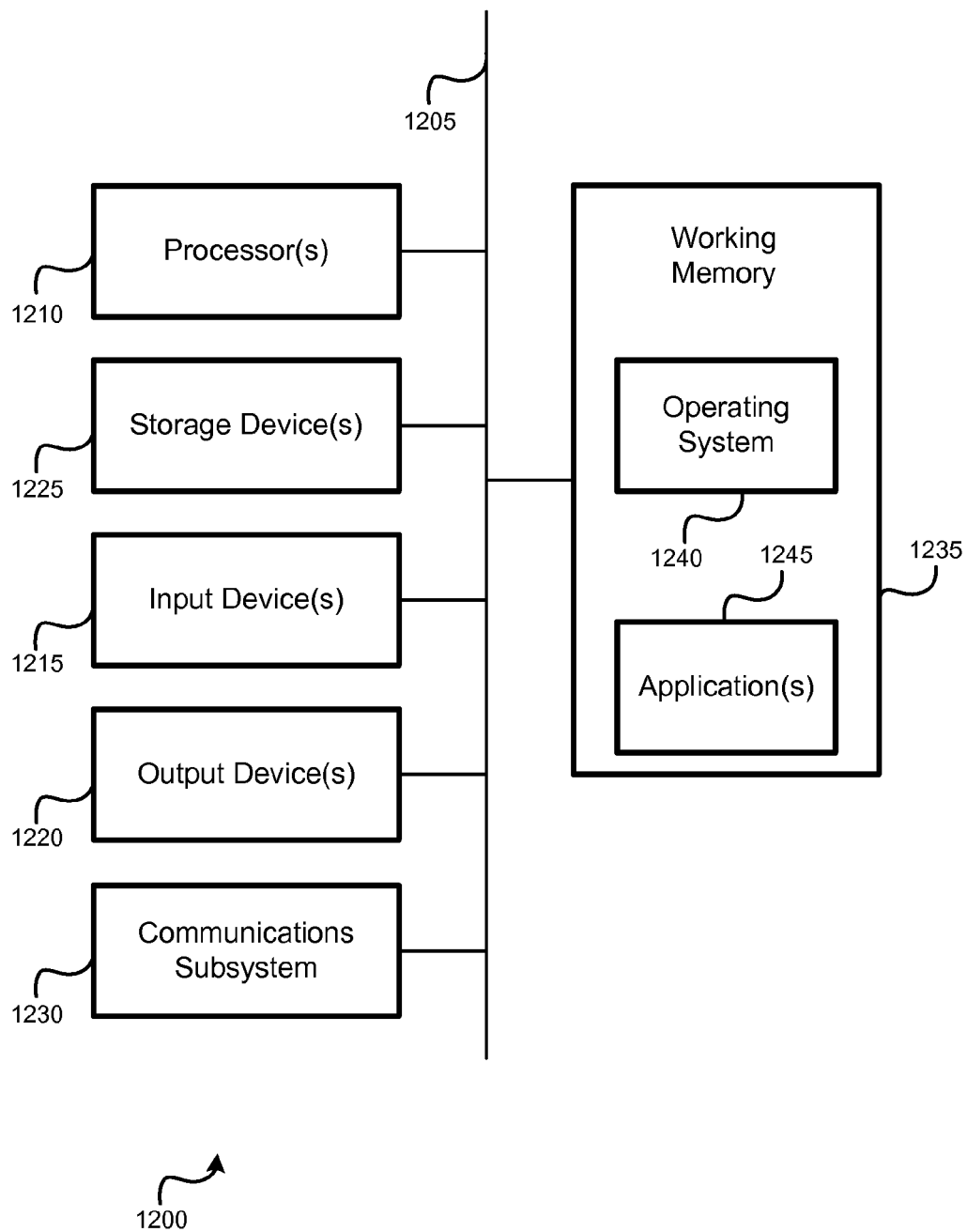
FIG. 12 illustrates an embodiment of a computer system, in accordance with certain embodiments of the present disclosure.

FIG. 12 illustrates an embodiment of a computer system 1200. A computer system 1200 as illustrated in FIG. 12 may be incorporated into devices such as a set top box (STB), a first electronic device, DVR, television, media system, personal computer, and the like. Moreover, some or all of the components of the computer system 1200 may also be incorporated into a portable electronic device, mobile phone, or other device as described herein. FIG. 12 provides a schematic illustration of one embodiment of a computer system 1200 that can perform the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which can include without limitation a mouse, a keyboard, a camera, and/or the like; and one or more output devices 1220, which can include without limitation a display device, a printer, and/or the like.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device, and/or a chipset (such as a Bluetooth™ device, an 1202.11 device, a WiFi device, a WiMax device, cellular communication facilities, etc.), and/or the like. The communications subsystem 1230 may include one or more input and/or output communication interfaces to permit data to be exchanged with a network (such as the network described below, to name one example), other computer systems, television, and/or any other devices described herein. Depending on the desired functionality and/or other implementation concerns, a portable electronic device (or similar device) may communicate image and/or other information via the communications subsystem 1230. In other embodiments, a portable electronic device, e.g. the first electronic device, may be incorporated into the computer system 1200, e.g., STB, as an input device 1215. In many embodiments, the computer system 1200 will further comprise a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) and features discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1200) to perform methods in accordance with various embodiments of the technology. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 (and/or components thereof) generally will receive signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bind the scope of the claims.

What is claimed is:

1. A system for remote user navigation of content displayed with a screen display, the system comprising:
   a display device comprising a screen display;
   a user input device configured to:
      detect a plurality of user movements, including at least a first user movement, wherein the first user movement comprises a first direction and a first speed; and
      communicate information based on the plurality of detected user movements; and
   a media device configured to receive communications from the user input device, wherein the media device comprises:
   one or more processors; and
   memory communicatively coupled with, and readable by, the one or more processors, the memory having stored therein processor-readable instructions, which, when executed by the one or more processors, cause the one or more processors to:
      process the information from the user input device;
      determine a baseline scrolling speed based on a baseline finger swipe speed;
      receive first user movement data from the user input device, the first user movement data comprising data indicating the first direction and the first speed;
      determine a scrolling operation for outputting electronic programming guide (EPG) content based on the first user movement data;
      determine a scroll speed for the scrolling operation, based at least in part on the first speed and based at least in part on the baseline scrolling speed, wherein the determined scrolling operation includes a zoom operation that automatically adjusts a zoom level for outputting EPG content, wherein the zoom level is proportional to the scroll speed of the scrolling operation; and
      output electronic programming guide (EPG) content to the display device in accordance with the scrolling operation, wherein the EPG content is output to the display device in accordance with the scroll speed and the automatically adjusting zoom level.

2. The system for remote user navigation of content displayed with the screen display of claim 1, wherein the user input device comprises a touch screen, and wherein plurality of the user movements are detected via the touch screen.

3. The system for remote user navigation of content displayed with the screen display of claim 1, wherein the user input device comprises one or more motion sensors, and wherein plurality of the user movements are detected via the one or more motion sensors.

4. The system for remote user navigation of content displayed with the screen display of claim 1, wherein the scroll speed is determined based at least in part on the difference between the first speed and the baseline scrolling speed.

5. The system for remote user navigation of content displayed with the screen display of claim 4, wherein the scroll speed is proportional to the difference between the first speed and the baseline scrolling speed.

6. The system for remote user navigation of content displayed with the screen display of claim 4, wherein the scrolling operation further comprises:
   increasing scroll speed up to the determined scroll speed; and
   decreasing scroll speed down from the determined scroll speed.

7. The system for remote user navigation of content displayed with the screen display of claim 4, wherein the scrolling operation further comprises:
   increasing scroll speed up to the determined scroll speed;
   decreasing scroll speed down from the determined scroll speed to a second scroll speed; and
   maintaining the second scroll speed for a time.

8. The system for remote user navigation of content displayed with the screen display of claim 4, wherein the scrolling operation further comprises:
   increasing scroll speed up to the determined scroll speed; and
   maintaining the determined scroll speed for a time.

9. The system for remote user navigation of content displayed with the screen display of claim 4, wherein determining the baseline scrolling speed comprises:
   receiving baseline user movement data from the user input device;
   determining that the first user is associated with the received baseline user movement data; and
   determining a user-specific baseline speed for the first user.

10. The system for remote user navigation of content displayed with the screen display of claim 1, wherein the displayed content comprises a two-dimensional programming guide, and the scrolling operation comprises a diagonal scrolling operation through the two-dimensional programming guide, in which a diagonal scrolling angle for the diagonal scrolling operation is determined based on the first direction of the first user movement data.

11. The system for remote user navigation of content displayed with the screen display of claim 1, wherein:
   the scrolling operation is a first scrolling operation;
   the user input device is further configured to:
      detect a second user movement; and
      communicate second information based at least in part on the second user movement; and
   the processor-readable instructions further cause the one or more processors to:
      process the second information from the user input device to identify a second scrolling operation; and
      output content to the display device in accordance with the second scrolling operation, wherein the second scrolling operation alters the display of content in accordance with the first scrolling operation.

12. The system for remote user navigation of content displayed with the screen display of claim 1, the media device further configured to:
   receive a command from the user input device to stop the scrolling operation for the output of EPG content;
   determine a rollback amount for the EPG content based at least in part on a user response time delay variable and the first scrolling speed; and
   roll back the displayed portion of the EPG content in accordance with the determined rollback amount.

13. A method for remote user navigation of content displayed with a screen display, the method comprising:
   determining a baseline scrolling speed based on a baseline finger swipe speed;

detecting a user movement that is repeated at a user input device;

processing information corresponding to the user movement detected at the user input device;

determining a first direction and a first speed corresponding to the user movement;

determining a first scrolling operation controlling the display of electronic programming guide (EPG) content to a display device;

determining a scroll speed for the first scrolling operation, based at least in part on the first speed and based on the baseline scrolling speed, wherein the determined first scrolling operation includes a zoom operation that automatically adjusts a zoom level for display of EPG content, wherein the zoom level is proportional to the scroll speed of the first scrolling operation;

retrieving a first predetermined scroll speed acceleration pattern and a first predetermined scroll speed deceleration pattern associated with the first scrolling operation; and outputting the electronic programming guide (EPG) content to the display device in accordance with the first scrolling operation, wherein the first scrolling operation comprises moving the displayed EPG content in accordance with the first predetermined scroll speed acceleration pattern and based on a number of times the user movement is repeated over a particular time period, and decelerating moving displayed EPG content in accordance with the first predetermined scroll speed deceleration pattern, and wherein first scrolling operation comprises automatically adjusting the zoom level of the displayed EPG content in accordance with a current scroll speed during the first predetermined scroll speed acceleration pattern and the first predetermined scroll speed deceleration pattern.

14. The method for remote user navigation of content displayed with the screen display of claim 13, wherein the user input device comprises a touch screen, and wherein the user movement is detected via the touch screen.

15. The method for remote user navigation of content displayed with the screen display of claim 13, wherein the first scroll speed deceleration pattern associated with the first scrolling operation includes maintaining a maximum first scroll speed for a predetermined period of time after the user movement has stopped.

16. The method for remote user navigation of content displayed with the screen display of claim 13, wherein the first scroll speed deceleration pattern associated with the first scrolling operation includes decelerating the moving displayed EPG content at a rate proportional to the acceleration of the moving displayed EPG content.

17. The method for remote user navigation of content displayed with the screen display of claim 13, wherein the first scroll speed deceleration pattern associated with the first scrolling operation includes decelerating the moving displayed EPG content from a maximum first scroll speed to a reduced first scroll speed, and then maintaining the reduced first scroll speed for a predetermined period of time.

18. The method for remote user navigation of content displayed with the screen display of claim 13, wherein the displayed content comprises a two-dimensional programming guide, the method further comprising:

determining a diagonal scroll angle for the first scrolling operation, based at least in part on the first direction of the first user movement data, wherein outputting the EPG content in accordance with the first scrolling operation comprises moving the displayed two-dimensional programming guide at the determined diagonal scroll angle.

19. A non-transitory computer-readable medium for remote user navigation of content displayed with a screen display, having sets of instructions stored thereon which, when executed by a computer, cause the computer to:

receive information from a user input device, wherein:
the information is based at least in part on a first direction and a first speed; and
the first direction and the first speed correspond to a detected finger swipe on a touchscreen of the user input device;

process the information from the user input device;

determine a baseline scrolling speed based on a baseline finger swipe speed;

determine a first scrolling operation controlling the display of electronic programming guide (EPG) content to a display device;

determine a scroll speed for the first scrolling operation, based at least in part on the first speed and based at least in part on the baseline scrolling speed, wherein the determined first scrolling operation includes a zoom operation that automatically adjusts a zoom level for display of EPG content, wherein the zoom level is proportional to the scroll speed of the first scrolling operation;

retrieve a first predetermined scroll speed acceleration pattern and a first predetermined scroll speed deceleration pattern associated with the first scrolling operation; and output the electronic programming guide (EPG) content to the display device in accordance with the first scrolling operation, wherein the first scrolling operation comprises moving the displayed EPG content in accordance with the first predetermined scroll speed acceleration pattern for a time period following discontinued finger contact with the touchscreen that is proportional to an amount of time finger contact is maintained with the touchscreen at an end of the finger swipe, and decelerating moving displayed EPG content in accordance with the first predetermined scroll speed deceleration pattern, and wherein first scrolling operation comprises automatically adjusting the zoom level of the displayed EPG content in accordance with a current scroll speed during the first predetermined scroll speed acceleration pattern and the first predetermined scroll speed deceleration pattern.

20. The non-transitory computer-readable medium for remote user navigation of content displayed with the screen display of claim 19, wherein the instructions further cause the computer to:

receive second information from the user input device, wherein the second information is based at least in part on a second user movement detected at the user input device;

process the second information from the user input device to identify a second scrolling operation; and output content to the display device in accordance with the second scrolling operation, wherein the second scrolling operation alters the display of content in accordance with the first scrolling operation.

* * * * *